United States Patent [19]

Lyndhurst

[11] 4,425,881
[45] Jan. 17, 1984

[54] RECIPROCATING ENGINE AIR INTAKE SYSTEM

[75] Inventor: Francis R. Lyndhurst, Costa Mesa, Calif.

[73] Assignee: Aero Power Engine Manufacturing, Inc., Incline Village, Nev.

[21] Appl. No.: 307,855

[22] Filed: Oct. 2, 1981

[51] Int. Cl.³ .............................................. F02B 75/22
[52] U.S. Cl. ............................ 123/52 MV; 123/90.39
[58] Field of Search ........ 123/52 M, 52 MC, 52 MV, 123/55 R, 55 VE, 90.39, 90.41, 193 C; 60/599

[56] References Cited

U.S. PATENT DOCUMENTS

| 2,759,462 | 8/1956 | Haltenberger | 123/52 MV |
|---|---|---|---|
| 2,801,620 | 8/1957 | Goodridge | 123/52 MV |
| 2,871,842 | 2/1959 | Dolza | 123/52 MV |
| 2,915,049 | 12/1959 | Armstrong et al. | 123/52 MV |
| 2,991,776 | 7/1961 | Dolza et al. | 123/52 MV |
| 3,232,042 | 2/1966 | Sarra | 60/599 |
| 3,301,238 | 1/1967 | Hanley | 123/90.41 |
| 3,520,286 | 7/1970 | Ravenel | 123/90.41 |
| 3,536,123 | 10/1970 | Izumi | 123/193 C |
| 4,165,720 | 8/1979 | Barcak | 123/41.31 |

FOREIGN PATENT DOCUMENTS 689096 6/1964 Canada .................... 123/52 MV
1048083 8/1957 Fed. Rep. of Germany .

Primary Examiner—Craig R. Feinberg
Assistant Examiner—W. R. Wolfe
Attorney, Agent, or Firm—William W. Haefliger

[57] ABSTRACT

An internal combustion engine has air intake manifolding proximate two parallel cylinder heads, the heads extending longitudinally and being laterally spaced, and (a) the manifolding includes runner ducts that extend generally laterally and in generally parallel relation,
(b) each runner duct has a discharge end communicating with intake valve porting associated with one of the heads,
(c) each runner duct has an intake end spaced generally laterally from its discharge end, the intake ends extending in two parallel rows that extend longitudinally,
(d) and a plenum chamber communicates with the intake ends and via which air is supplied to both of the rows of runner duct intake ports.

17 Claims, 15 Drawing Figures

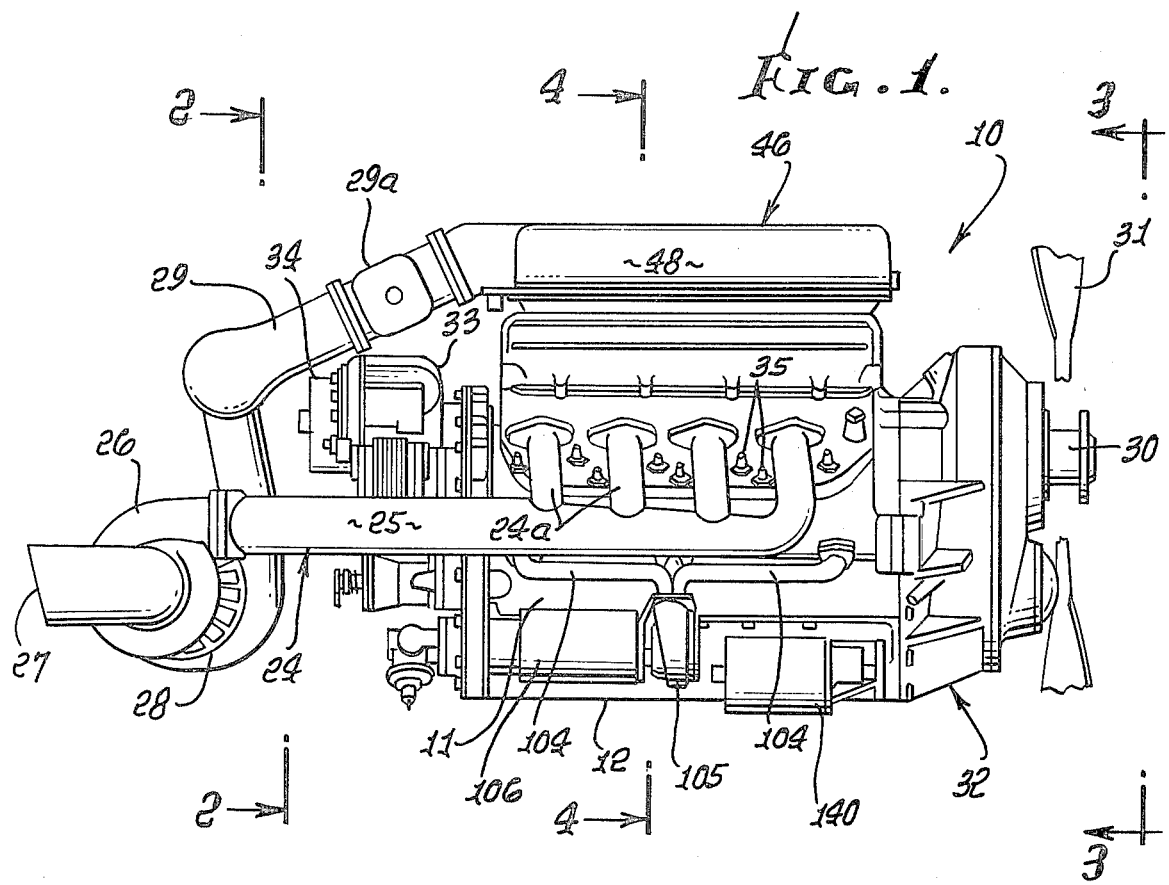
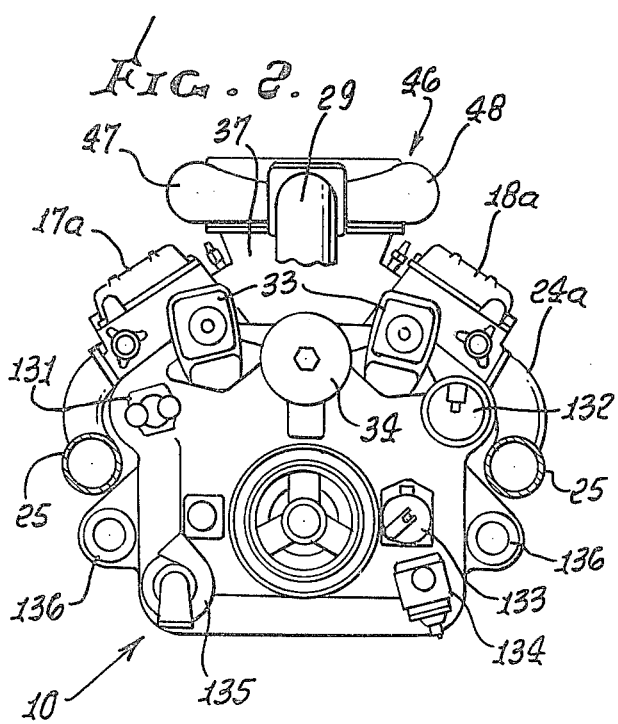

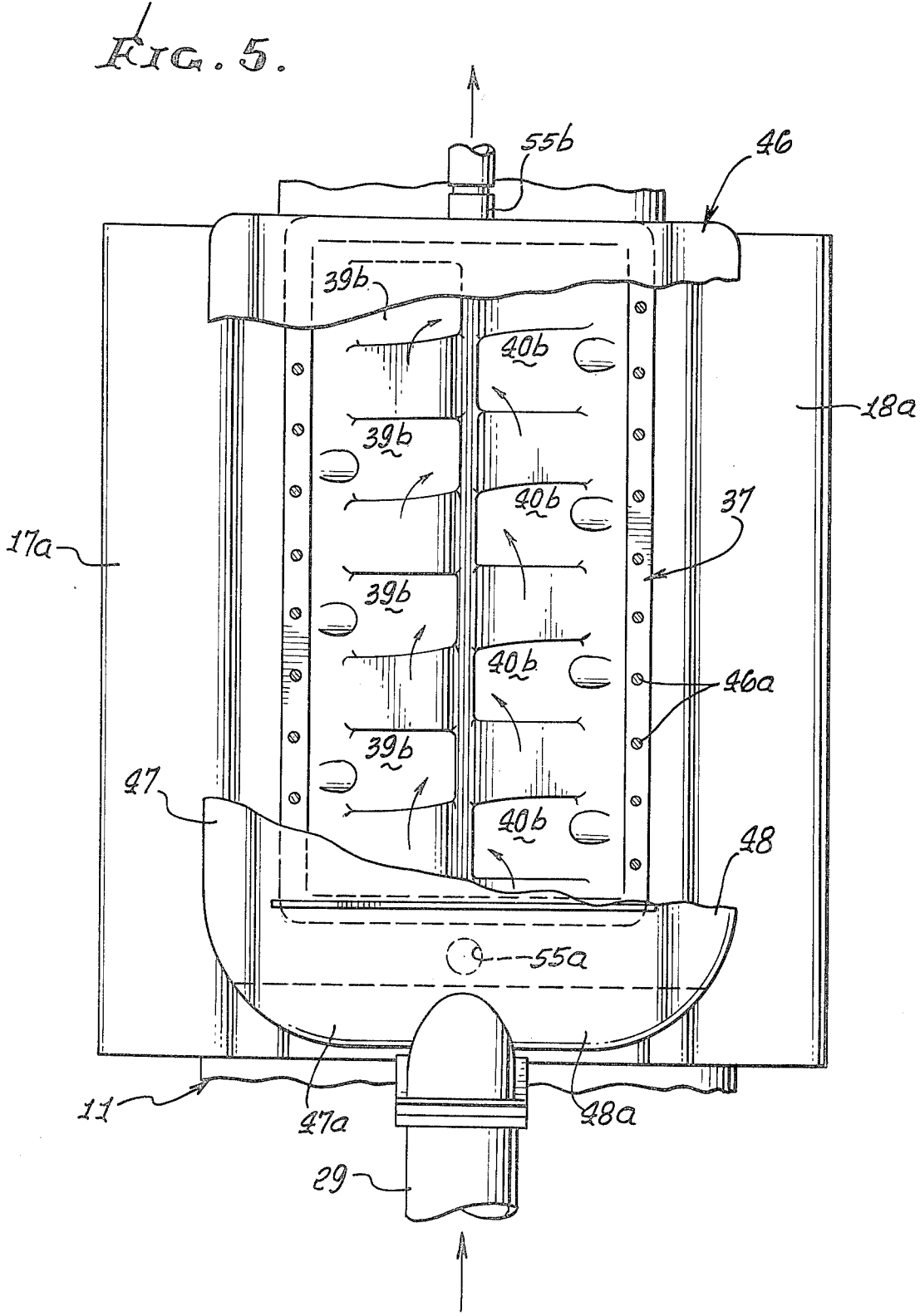

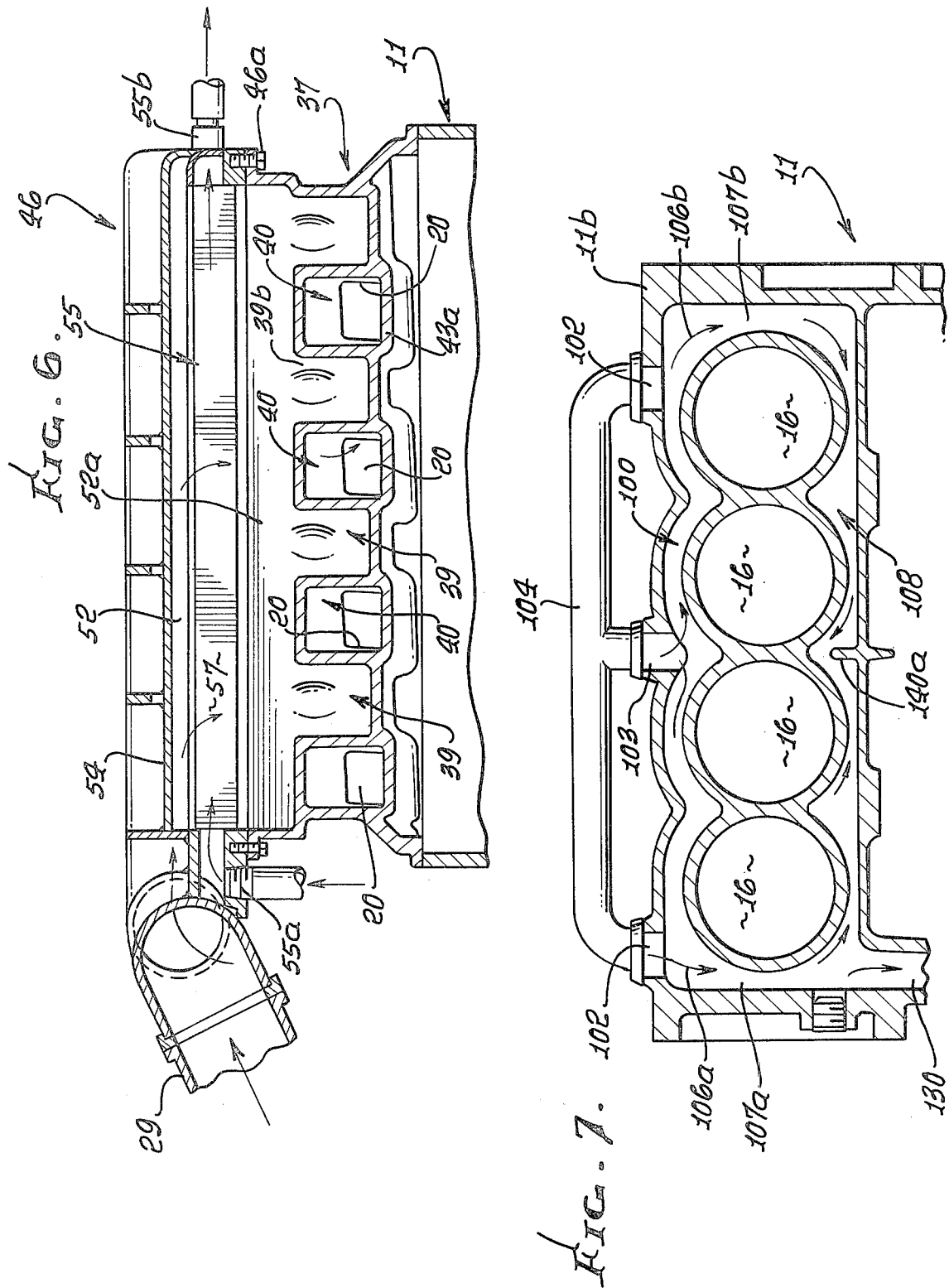

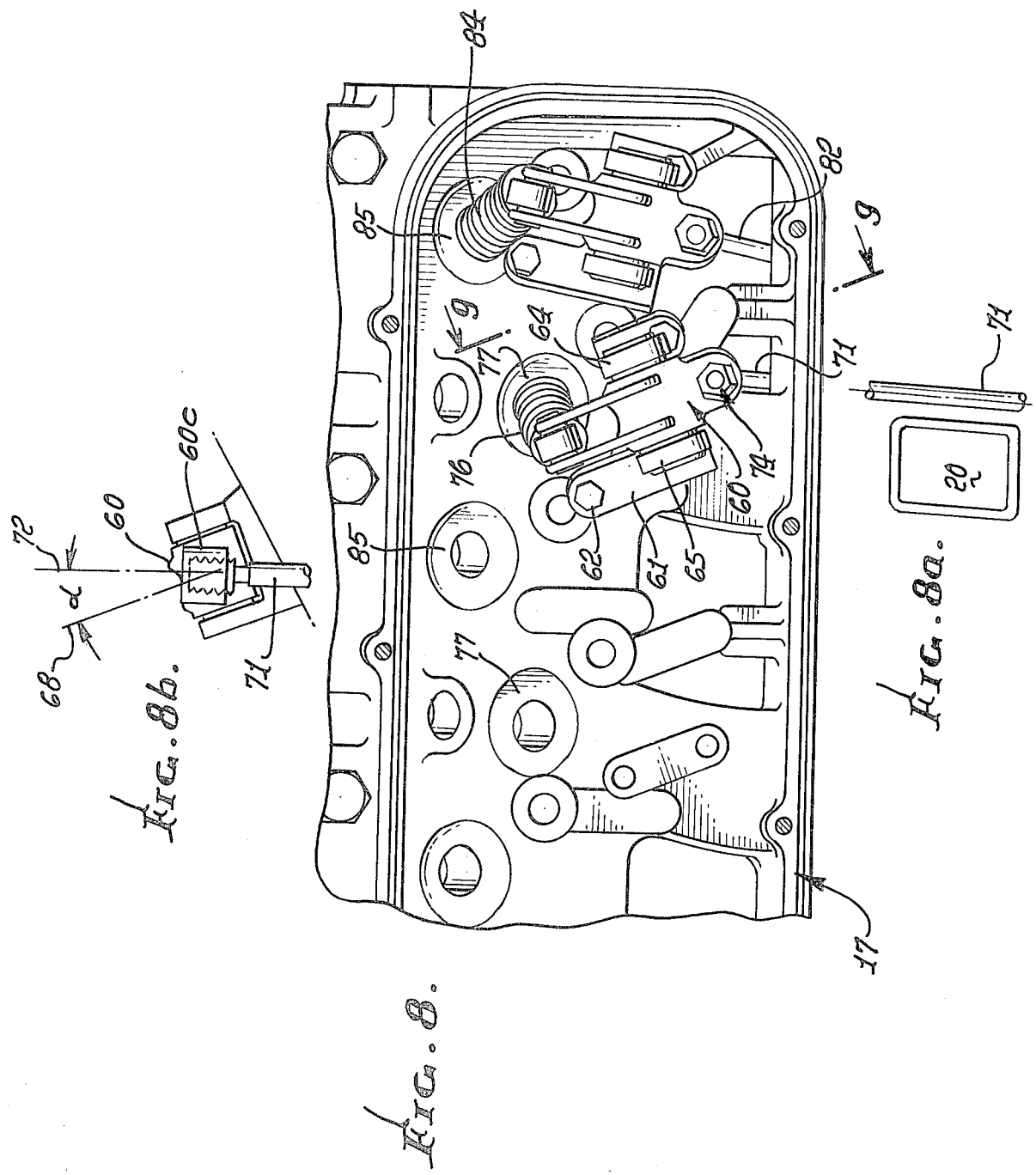

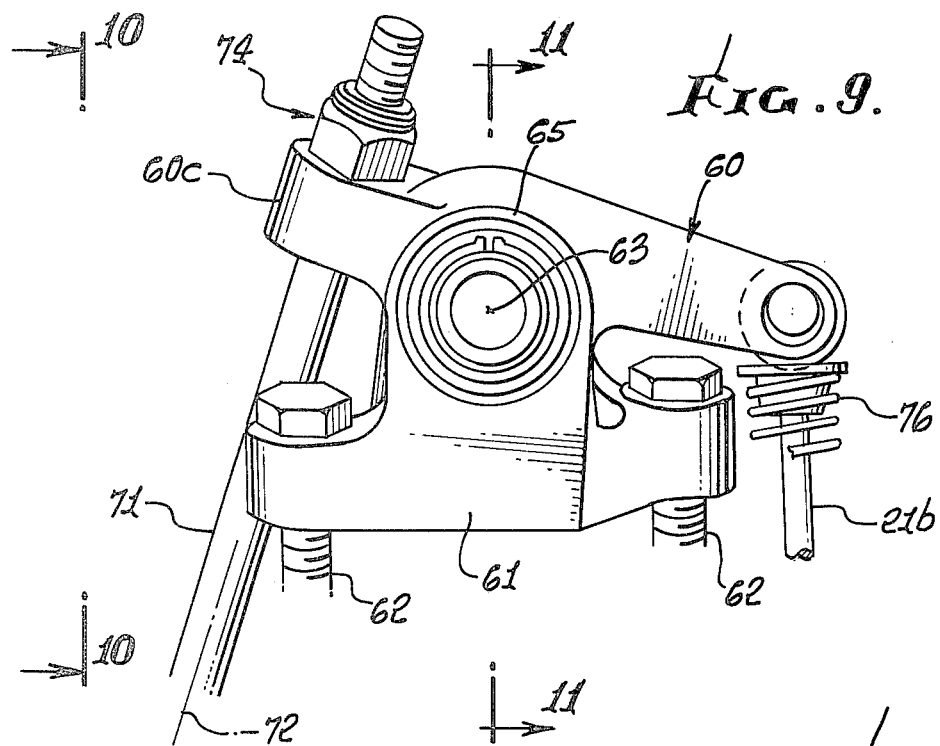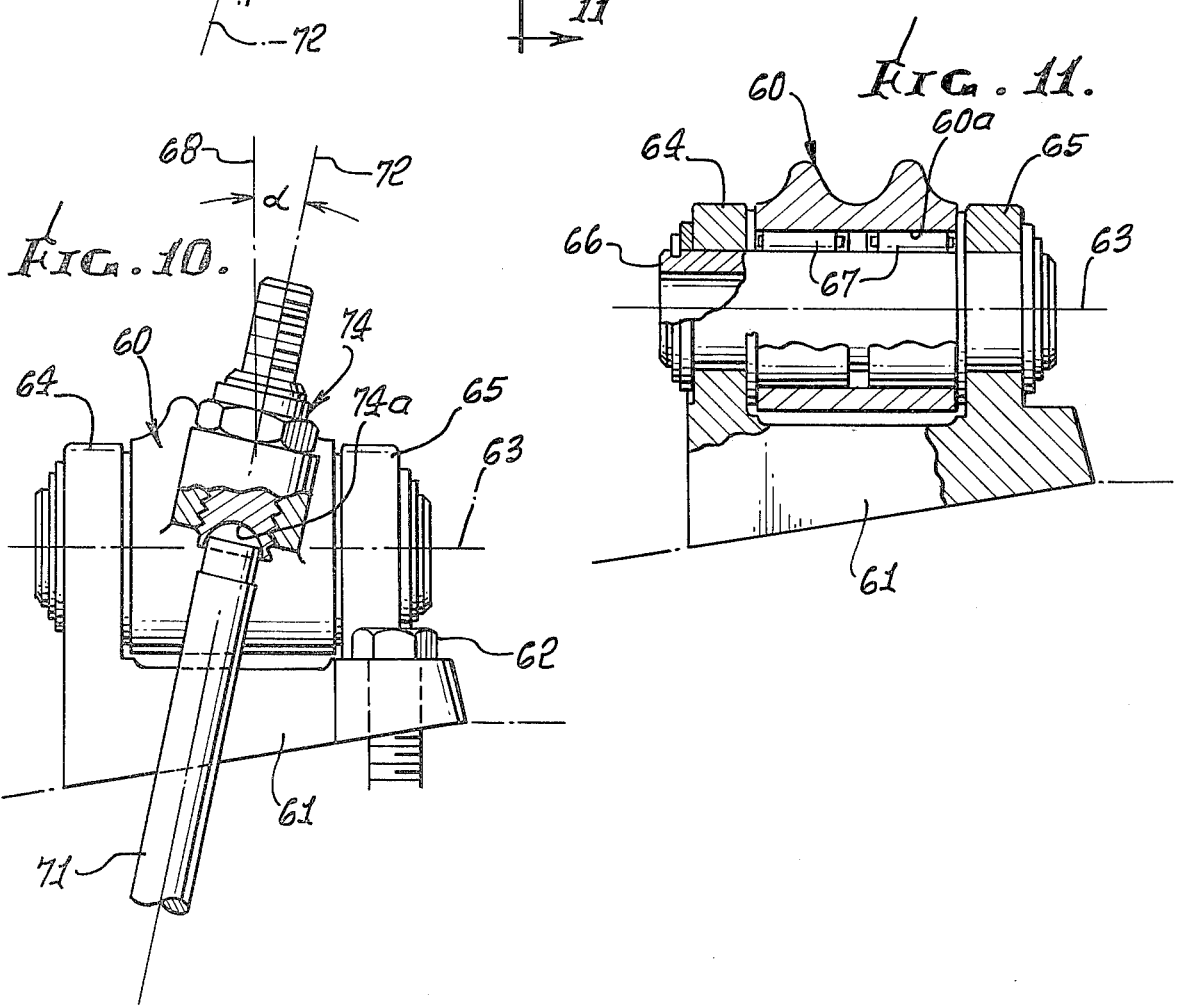

RECIPROCATING ENGINE AIR INTAKE SYSTEM

BACKGROUND OF THE INVENTION

This invention relates generally to internal combustion engines of reciprocating type, and more particularly concerns an improved air intake system for such an engine, typically of light weight metal construction.

There is a need for high performance engines of the above type, wherein the horsepower to weight ratio is unusually high. Aircraft engines are one example. In order to achieve these ends, it is desirable to compress the entering air to increase its density; however, it is also desirable to provide for minimum restriction to air flow to the air intake ports of the engine. This presents a number of problems in V-shaped engine blocks, due to space limitations and rocker arm locations. Also, cooling of the entering air flow is desirable.

SUMMARY OF THE INVENTION

It is a major object to provide solutions to the above problems as well as additional improvements and unusual structural advantages, as will appear. Basically, the invention is embodied in an engine having air intake manifolding proximate two cylinder heads which extend longitudinally and are laterally spaced, the improvement combination comprising (a) the manifolding including runner ducts that extend generally laterally and in generally parallel relation, (b) each runner duct having a discharge end communicating with intake valve porting associated with one of the heads, (c) each runner duct having an intake end spaced generally laterally from its discharge end, the intake ends extending in two parallel rows that extend longitudinally, (d) and a plenum chamber communicating with such intake ends and via which air is supplied to both of the rows of runner duct intake ports.

Typically, the intake ends of the runner ducts are located to open upwardly, and the plenum chamber is located above those ducts which themselves extend laterally between the two cylinder heads; the runner ducts may be integral with a single lightweight metallic body supported between the two heads; and that body may support the plenum chamber.

Further, the runner ducts extending to the two heads may alternate, longitudinally; and laterally elongated straight path flow to each intake port of one head may be provided by locating the intake ends of the associated runner ducts closer to the other head, thereby achieving balanced design and enhanced performance.

Additionally, the plenum chamber may have dual, longitudinally extending, laterally spaced intake air headers receiving compressed air and distributing it laterally along the length of the plenum chamber and to zones directly above the rows of runner duct intake ends, for downward flow into those ends with maximum compression and pressurization; and the entering air may be cooled to higher density in the plenum chamber, as will be seen.

Further, air intake valve rocker arms may have push rods skewed relative to planes normal to the rocker arm pivot axes so as to locate the push rods entirely outside the intake ports in the heads, despite intersection of those planes with the intake ports, so that the rods do not obstruct entering air flow streams.

These and other objects and advantages of the invention, as well as the details of an illustrative embodiment, will be more fully understood from the following specification and drawings, in which:

DRAWING DESCRIPTION

FIG. 1 is a side elevation of an engine incorporating the invention;

FIG. 2 is an end elevation taken on lines 2—2 of FIG. 1;

FIG. 3 is an end elevation taken on lines 3—3 of FIG. 1;

FIG. 5 is a top plan view taken on lines 5—5 of FIG. 4, and partly broken away to show interior construction;

FIG. 6 is a section taken on lines 6—6 of FIG. 4;

FIG. 7 is a section taken on lines 7—7 of FIG. 4;

FIG. 8 is an enlarged view taken on lines 8—8 of FIG. 4;

FIG. 8a is an enlarged view showing a push rod related to an intake valve port.

FIG. 8b is an enlarged view showing a rocker arm and push rod relationship.

FIG. 9 is a further enlarged section taken on lines 9—9 of FIG. 8;

FIG. 10 is an elevation taken on lines 10—10 of FIG. 9; and

FIG. 11 is a section taken on lines 11—11 of FIG. 9.

GENERAL DESCRIPTION

Figure 4:
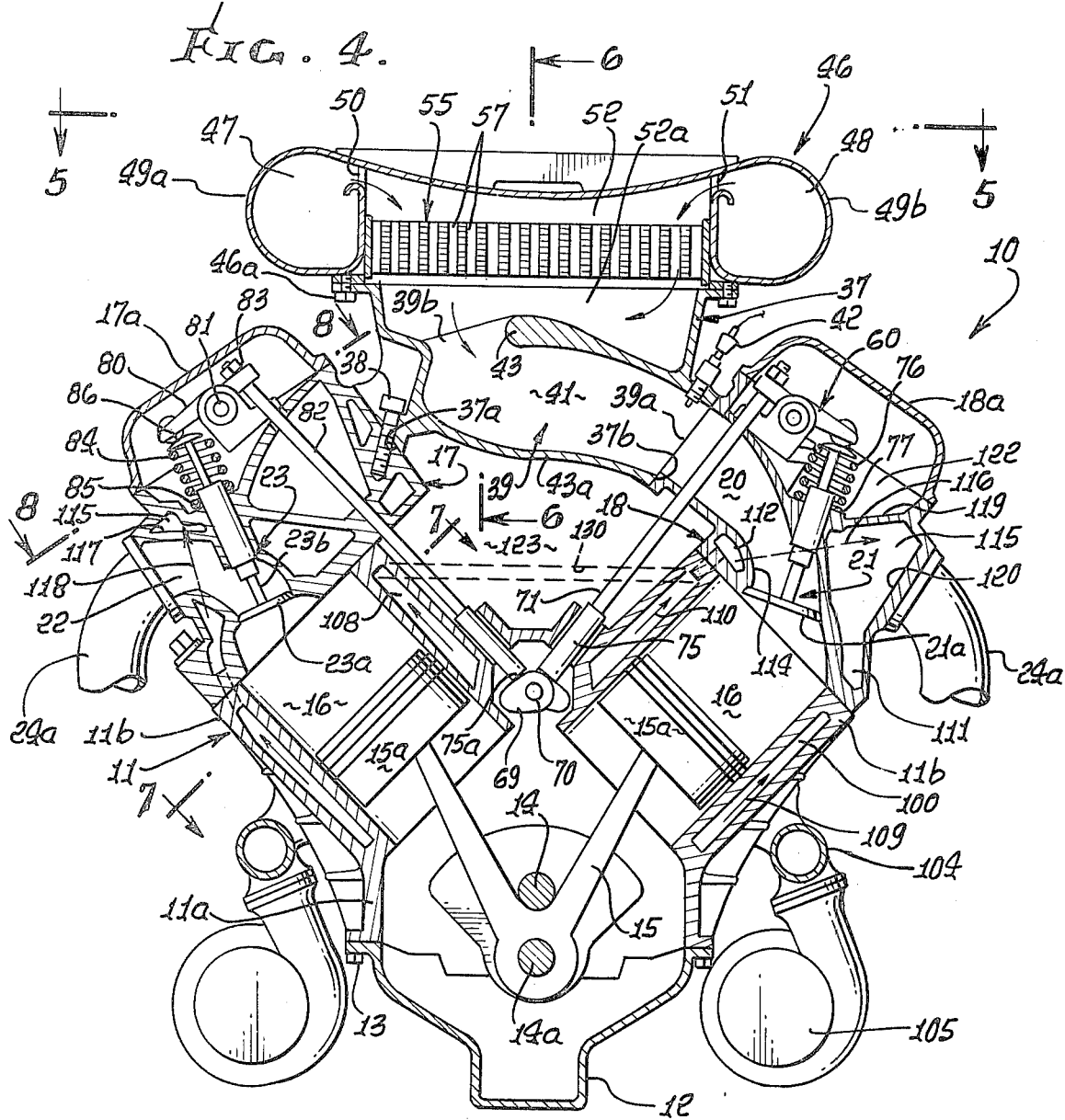
FIG. 4 is a section taken on elevation on lines 4—4 of FIG. 1.

In FIGS. 1–4 the internal combustion engine 10 includes a block 11 which is generally Y-shaped in vertical section, as seen in FIG. 4. Crankcase pan 12 is connected at 13 to the downwardly extending crankcase section 11a of the block, that section containing the crankshaft 14 having throws 14a, and connected with pistons 15a via rods 15. The pistons are arranged in two parallel banks, at V-shaped angles, to reciprocate within cylinders 16 defined by the block V-sections 11b. Cylinder heads 17 and 18 are attached at 17b to the block sections 11b, and head covers 17a and 18a are mounted to the heads, as shown. The block may advantageously comprise cast aluminum silicon alloy as disclosed in U.S. Pat. No. Re. 27,081, providing an over all lightweight construction suitable for aircraft, for example.

The cylinder heads define air/fuel mixture intake ports 20 which are controlled by intake valves 21 having heads 21a and extending in two parallel longitudinal rows; and the cylinder heads also define exhaust outlet ports 22 controlled by valves 23 having heads 23a and extending in two parallel longitudinal rows.

Exhaust manifolds 24 include feeder ducts 24a connected to the cylinder heads to receive exhaust gases from ports 22, and main ducts 25 connected with the feeder ducts and extending generally longitudinally to deliver hot, high velocity exhaust gases to turbines 26 having discharge outlets at 27. The turbines drive compressors 28 which in turn compress intake air for delivery via duct 29 to the air intake system. An air flow meter appears at 29a.

As seen in FIG. 1, an output shaft 30 carries a propeller 31, the shaft 30 being driven via speed reducing gearing in transmission housing 32. That gearing couples the crankshaft 14 to shaft 30. Magnetos 33 and alternator 34 provide properly timed ignition voltage pulses to spark plugs 35, two for each cylinder.

AIR/FUEL SUPPLY SYSTEM

Referring to FIGS. 4 and 5, the engine has air intake manifolding 37 proximate the two parallel cylinder heads 17 and 18. That manifolding may advantageously comprise a single metallic body, cast from aluminum or magnesium. The manifold block is shown in FIG. 4 as having its opposite lower sides 37a and 37b extending in V-shaped planes and nested between and connected to the two heads 17 and 18, as via connectors 38.

Figure 4A:
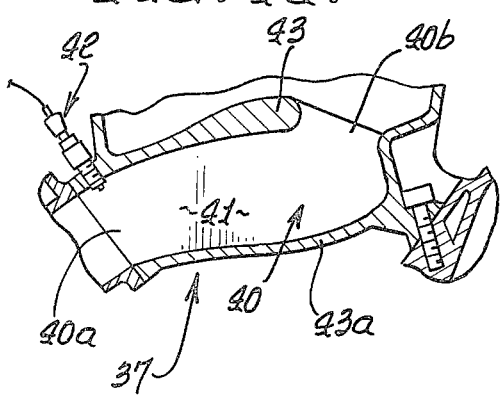
FIG. 4a is a fragmentary view of a leftward extending runner duct.

The manifolding 37 includes integral runner ducts 39 and 40 that extend generally laterally and in generally parallel relation, with adjacent ducts, (except the longitudinally opposite end ducts) separated by a common wall 41. Ducts 39 extend rightwardly toward discharge ends 39a communicating with intake valve ports 20 associated with head 18; and ducts 40 extend leftwardly toward discharge ends 40a communicating with intake valve ports 20 associated with head 17 (see FIG. 4a). Each runner duct has an intake end spaced generally laterally from its discharge end, and the intake ends 39b extend in a longitudinal row spaced laterally from the longitudinally extending row of intake ends 40b. All intake ends open inwardly, as shown. This arrangement of runner ducts and common walls between the ducts achieves reduced weight, compactness, and uniform high volume and mass flow patterns of cooled compressed air into the intake valve porting in the heads, with uniform temperature distribution in each set of ducts as loci in longitudinal planes. Note the fuel injectors 42 located to inject fuel into the high velocity air streams at the discharge ends 39a and 40a. Note also the upper walls 43 of the ducts extending from the mid-portion of the plenum chamber toward the discharge ends of the ducts, whereby the inlet ends 39b of ducts 39 are closer to head 17 than to head 18, and the inlet ends 40b of ducts 40 are closer to head 18 than to head 17. Ducts 39 extend in alternating relation with ducts 40, in the longitudinal direction, one duct for each port 20. Bottom walls 43a extend across the space between heads 17 and 18.

Also provided is a plenum chamber 46 in open and direct communication with the intake ends 39b and 40b, and via which high volume, high pressure air is supplied to both sets or rows of runner ducts 39 and 40, via upwardly opening ports 39b and 40b, for high efficiency. Bolts 46a attach the plenum to body 37.

As shown, chamber 46 has two longitudinally extending laterally spaced header zones or ducts 47 and 48 connected as via duct 29 and laterally extending branch ducts 47a and 48a to receive delivery of pressurized intake air. The ducts or zones 47 and 48 have arcuate, and generally circular cross sections formed by generally circular walls 49a and 49b, to direct air flow laterally via elongated side openings 50 and 51 toward the upper interior 52 of the plenum chamber. That chamber has an upper wall 54 which is downwardly convex so as extend downwardly and laterally toward the uppermost mid-portion of the chamber, thereby to deflect the entering air downwardly toward the upwardly opening intake ends 39b and 40b of the runner ducts.

Figure 4B:
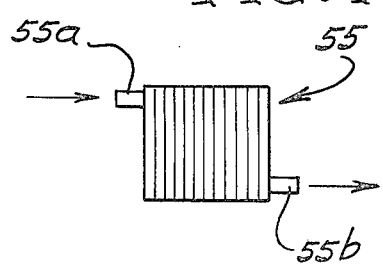
FIG. 4b is a plan view of a heat exchanger.

Air cooling means is provided in the plenum chamber in the path of entering air flowing downwardly. Such means typically comprises a heat exchanger as at 55, that extends longitudinally and laterally horizontally between upper open interior 52 and lower open interior 52a of the chamber 46, and having vertical ports 57 to pass the air freely downwardly but in contact with the thin exchanger walls that form passages flowing coolant fluid. FIG. 4b shows coolant fluid entering the exchanger 55 via inlet port 55a and leaving via outlet port 55b. Accordingly, the high pressure entering air is cooled to increase its density just prior to entering the elongated ducts 39 and 40, for increasing engine horsepower.

VALVE ACTUATION

Referring to FIGS. 4 and 8–11, a rocker arm 60 is associated with each intake valve 21, and is carried by the associated head 17 or 18. Rocker arm support 61 is bolted at 62 to the head, and the arm defines a pivot axis 63. FIG. 11 shows support 61 as having bifurcations 64 and 65 receiving a tubular bearing pin 66. Needle bearings 67 are located between pin 66 and the rocker arm bore 60a.

Each valve 21 includes a stem 21b extending in a first plane 68 normal to pivot axis 63 (see FIGS. 8 and 10). Engine driven cams 69 on cam shaft 70 activate push rods 71 respectively associated with the rocker arms. Each push rod is reciprocable along axis 72 that extends at a skew angle $\alpha$ (in FIG. 10) relative to plane 68, so that each push rod extends outside the intake valve porting associated with that intake valve. Thus, the push rods pass through the head between and outside intake valve ports 20 extending in a longitudinal row in that head. FIGS. 9 and 10 show the rocker arm as having a skewed or twisted end portion 60c to provide a threaded connection at 74 in alignment with axis 72 and via which the push rod actuates the rocker arm. A seat for the end of the rocker arm is shown at 74a in FIG. 10. The axis of that seat is in alignment with axis 72. The lifter 75 at the opposite end of the push rod engages a cam as at 75a in FIG. 4. A compression spring 76, seated at 77, urges the rocker arm counterclockwise in FIGS. 4 and 9, in a valve head seating direction. Each plane 68 intersects a port 20 and a runner duct 39 or 40, as the case may be.

FIG. 4 also shows exhaust valve rocker arms 80, pivoted at 81, and having push rods 82 connected with the arms at 83. Compression springs 84, seated at 85, urge the arms in a clockwise, valve seating direction. Valve stems 23b are connected with the arms at 86.

COOLING SYSTEM

Referring now to FIGS. 4 and 7, the cylinder block sections 11b (which may be separate from crankcase section 11a and attached thereto) form coolant passages proximate the cylinders. Passages 100 are formed at one side of the cylinders, and passages 108 are formed at the opposite sides of the cylinders. Multiple coolant fluid (water for example) inlets are located to intersect passages 100 near the longitudinally opposite ends of passages 100, and at the middle of each elongated passage. See inlets 102 and 103. Coolant inlet manifold 104 communicates with those inlets, and coolant fluid pumps are provided at 105, as seen in FIG. 1.

The coolant from inlet 103 is thereby caused to flow endwise and upwardly in the elongated passage 100 adjacent the outer sides of the cylinders 16; also, the coolant from inlets 102 flows in passages 107a and 107b aroaund opposite ends of the row of cylinders, two streams being shown at 106a and 106b, to supply coolant to passages 108 along the opposite, and inner sides of the cylinders. Thus, the coolant supplied to passages 108 is not heated by first flowing in passages 100.

The coolant in passages 100 and 108 flows generally upwardly, as indicated by arrows 109 and 110, respectively, in FIG. 4, under pressurization and also due to convection, the fluid being progressively heated.

Each head 17 and 18 has first and second coolant passages 111 and 112 respectively in communication with cylinder block passages 100 and 108, to receive upward flow of coolant. The second passages 112 extend proximate the air/fuel intake porting 20, to flow coolant upwardly past walls 114 defining that porting and to an upper zone 115 in the head, as indicated by arrow 116. The first passages 111 extend proximate the exhaust porting 22, to flow coolant upwardly pass walls 117 defining that porting and to upper zone 115 in the head, as indicated by arrow 118.

Accordingly, the two flow streams 116 and 118 merge in the upper zone 115 in each head, and are withdrawn from the ends of the heads as via ducts 119, shown in FIG. 3. Therefore, it is seen that the hotter stream of coolant 118 does not pass adjacent the air/fuel mixture intake porting 20, or adjacent the intake runner ducts 39 and 40, which generally extend at a higher level than the passages 111 and 112. Consequently, the incoming air/fuel mixture is not warmed by heat from the warmer or hotter coolant flow at 118.

Note that upper walls 119 and 120 of each head taper upwardly, to merge the two flows 111 and 112 toward uppermost zone 115, for endwise flow and exit from the head. Finally, the upper wall 119 is inclined laterally inwardly and downwardly, to drain lubricant in space 122 toward the interior space 123. Rocker arms 60 and associated mechanism are lubricated in space 123 and lubricant flowing toward interior space 123, below the air/fuel mixture manifolding, for draining. Accordingly, walls 119 serve multiple functions.

FIG. 7 also shows a barrier 140a at the middle of passage 108 to partially block endwise flow of coolant therein and deflect coolant to flow upwardly. Accordingly, approximately balanced heating of the coolant takes place in the passages 100 and 108 (i.e. there are two streams of coolant respectively in opposite portions of passage 100, and two streams of coolant respectively in opposite portions of passage 108).

To complete the description of the engine, a starter is shown at 140 in FIG. 1; hydraulic and vacuum pumps appear at 131 and 132 in FIG. 2; a propeller pitch control is indicated at 133 and a fuel pump at 134, a pump for the intercooler 55 appears at 135, and engine mounts are provided at 136. An oil pump appears at 106.

The duct 130 shown in FIGS. 4 and 7 interconnects the coolant passages 108 in the two block sections 11b, duct 130 also being in the block. Thus, if one of the two coolant pumps 105 fails for any reason, the other coolant pump can supply coolant to the coolant passages in both block sections 11b.

I claim:

1. In an internal combustion engine having air intake manifolding proximate two parallel cylinder heads, the heads extending longitudinally and being laterally spaced, the improvement combination comprising (a) said manifolding including runner ducts that extend generally laterally and in generally parallel relation,
   (b) each runner duct having a discharge end communicating with intake valve porting associated with one of said heads,
   (c) each runner duct having an intake end spaced generally laterally from its discharge end, said intake ends facing upwardly and extending in two parallel rows that extend longitudinally, there being a plenum chamber directly above said intake ends, and at least one elongated header zone having an elongated side outlet to supply compressed air to be deflected downwardly lengthwise of and in the plenum chamber, and an air cooler in the plenum chamber and facing said intake ends,
   (d) and including a rocker arm associated with each intake valve and carried by the associated head, each such valve having a stem extending in a first plane that is normal to a pivot axis defined by the rocker arm, there being an engine driven cam actuated push rod associated with each rocker arm, said push rod being reciprocable along an axis that extends at a skew angle relative to said plane so that all of the push rod extends outside said intake valve porting, said intake valve porting being intersected by said first plane, said intake valve porting extending laterally of its associated runner duct.

2. The improvement of claim 1 wherein the rocker arm carries a seat for the end of the push rod, said seat having an axis which is in alignment with the push rod axis of reciprocation.

3. The improvement of claim 1 wherein the rocker arm has a skewed end portion defining an axis in alignment with the rocker arm axis of reciprocation.

4. In an internal combustion engine having air intake manifolding proximate two parallel cylinder heads, the heads extending longitudinally and being laterally spaced, the improvement combination comprising (a) said manifolding including runner ducts that extend generally laterally and in generally parallel relation,
   (b) each runner duct having a discharge end communicating with intake valve porting associated with one of said heads,
   (c) each runner duct having an intake end spaced generally laterally from its discharge end, said intake ends extending in two laterally spaced parallel rows that extend longitudinally,
   (d) and a plenum chamber communicating with said intake ends and via which air is supplied to both of said rows of runner duct intake ports, said intake ends opening generally upwardly, and said plenum chamber being located above the runner ducts,
   (e) said runner ducts being formed by a single metallic intake body supported to have said runner ducts extending generally between said two heads,
   (f) said plenum chamber having two endwise longitudinally extending laterally spaced header zones to receive endwise longitudinal flow of compressed intake air, said header zones opening laterally along the lengths of said zones toward the upper interior of said plenum chamber via which intake air is supplied downwardly to said intake ends of the runner ducts,
   (g) said plenum chamber having an upper wall that extends convexly downwardly and laterally generally between said header zones and toward the uppermost mid-portion of said chamber, thereby to deflect the entering air downwardly toward said intake ends of the runner ducts, and including air cooling means in said plenum chamber below said upper wall in the path of air flow to said intake ends of the runner ducts, said air cooling means comprising a heat exchanger that extends longitudinally and laterally directly above the intake ends of all of said runner ducts, said intake ends facing upwardly toward the underside of said heat exchanger.

5. The improvement of claim 4 wherein the engine includes a cylinder block, said block consisting essentially of aluminum silicon alloy material.

6. The improvement combination of claim 4 wherein said intake body is attached to said heads and mounts said plenum chamber.

7. The improvements of claim 6 wherein the engine includes a cylinder block that has V-shape and supports said heads, the runner ducts located above a space formed between the heads.

8. The improvement of claim 4 including means to supply combustible fuel to air being delivered via said runner ducts.

9. The improvement of claim 8 wherein said last named means comprises fuel injectors associated with said runners ducts to inject fuel into the air streams in said ducts.

10. The improvement combination of claim 1 including an air compressor connected in compressed air delivering relation with said header zones.

11. The improvement combination of claim 10 including an engine exhaust driven turbine connected in driving relation with said air compressor.

12. The improvement of claim 4 including a rocker arm associated with each intake valve and carried by the associated head, each such valve having a stem extending in a first plane that is normal to a pivot axis defined by the rocker arm, there being an engine driven cam actuated push rod associated with each rocker arm, said push rod being reciprocable along an axis that extends at a skew angle relative to said plane so that all of the push rod extends outside said intake valve porting, said intake valve porting being intersected by said first plane, said intake valve porting extending laterally of its associated runner duct.

13. The improvement of claim 12 wherein the rocker arm carries a seat for the end of the push rod, said seat having an axis which is in alignment with the push rod axis of reciprocation.

14. The improvement of claim 12 wherein the rocker arm has a skewed end portion defining an axis in alignment with the rocker arm axis of reciprocation.

15. The improvement combination of claim 4 wherein first runner ducts have their discharge ends associated with one of said heads, and second runner ducts have their discharge ends associated with the other of said heads.

16. The improvement combination of claim 15 wherein said first runner ducts alternate, longitudinally, with said second runner ducts.

17. The improvement combination of claim 16 wherein said first runner ducts have their intake ends located closer to said other head than to said one head, and said second runner ducts have their intake ends located closes to said one head than to said other head.

* * * * *